(12) United States Patent
Pelly et al.

(10) Patent No.: US 7,263,615 B2
(45) Date of Patent: Aug. 28, 2007

(54) APPARATUS AND METHOD FOR DETECTING EMBEDDED WATERMARKS

(75) Inventors: Jason Charles Pelly, Reading (GB); Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 815 days.

(21) Appl. No.: 10/317,973

(22) Filed: Dec. 12, 2002

(65) Prior Publication Data

US 2003/0131243 A1 Jul. 10, 2003

(30) Foreign Application Priority Data

Dec. 13, 2001 (GB) ................ 0129836.3

(51) Int. Cl.
*H04L 9/00* (2006.01)
*G06K 9/00* (2006.01)
*G06K 9/40* (2006.01)
*G06K 9/36* (2006.01)

(52) U.S. Cl. ............... 713/176; 382/181; 382/276; 382/278

(58) Field of Classification Search ........ 713/176; 382/278
See application file for complete search history.

(56) References Cited

U.S. PATENT DOCUMENTS

| 5,291,563 | A | * | 3/1994 | Maeda ............... 382/103 |
| 5,915,027 | A | * | 6/1999 | Cox et al. ........... 380/54 |
| 5,949,885 | A | * | 9/1999 | Leighton ............ 380/54 |
| 6,278,792 | B1 | | 8/2001 | Cox et al. |
| 6,477,431 | B1 | * | 11/2002 | Kalker et al. ........ 700/39 |
| 6,738,493 | B1 | * | 5/2004 | Cox et al. .......... 382/100 |
| 6,901,514 | B1 | * | 5/2005 | Iu et al. ............ 713/176 |
| 7,051,203 | B1 | * | 5/2006 | Smith .............. 713/168 |
| 2001/0046308 | A1 | | 11/2001 | Nakano et al. |

FOREIGN PATENT DOCUMENTS

| EP | 0 840 513 | 5/1998 |
| EP | 1 030 511 | 8/2000 |
| GB | 2 328 579 | 2/1999 |
| GB | 2 358 100 | 7/2001 |

(Continued)

OTHER PUBLICATIONS

Cox et al , "Secure Spread Spectrum Watermarking for Multimedia", IEEE Transaction on Image Processing, vol. 6, No. 12, Dec. 1997, pp. 1673-1687.*

(Continued)

*Primary Examiner*—Kim Vu
*Assistant Examiner*—Ponnoreay Pich
(74) *Attorney, Agent, or Firm*—Oblon, Spivak, McClelland, Maier & Neustadt, P.C.

(57) ABSTRACT

A detecting data processing apparatus configured to identify at least one of a plurality of code words present in a marked version of a material item. The detecting apparatus including a registration processor operable to compare the samples of the marked material item with a copy of the original material item samples. If a sample of the marked material item and the original material item differ by a comparison threshold, the registration processor replaces the compared sample of the marked material item with the corresponding sample from the original material item.

5 Claims, 4 Drawing Sheets

FOREIGN PATENT DOCUMENTS

| | | |
|---|---|---|
| JP | 2000216984 | 8/2000 |
| WO | WO98 03014 | 1/1998 |
| WO | WO98/54897 | 12/1998 |
| WO | WO99/38318 | 7/1999 |
| WO | WO99/45706 | 9/1999 |
| WO | WO 01 50409 | 7/2001 |
| WO | WO 01/76253 | 10/2001 |

OTHER PUBLICATIONS

Wang et al, "DCT-Based Image-Independent Digital Watermarking", Proceedings of ICSP2000, copyright 2000, pp. 942-945.*

Cox I J et al: "Secure spread spectrum watermarking for multimedia" IEEE Transactions on Image Processing, Dec. 1997, IEEE, USA, vol. 6, No. 12, pp. 1673-1687, XP002282585, ISSN: 1057-7149.

Du Buf J M et al: "A Quantitative Comparison Edge-Preserving Smoothing Techniques" Signal Processing, Elsevier Science Publishers B.V. Amsterdam, NL, vol. 21, No. 4, Dec. 1, 1990, pp. 289-301, XP000175689 ISSN: 0165-1684.

Proc. Int. Conf. On Image Processing, 1999, ICIP 99, vol. 1, pp. 296-300, "An image watermarking method based on the wavelet transform", H Inoue et al, ISBN: 0-7803-5467-2.

* cited by examiner

PERSON'S HEAD

APPARATUS AND METHOD FOR DETECTING EMBEDDED WATERMARKS

FIELD OF INVENTION

The present invention relates to detecting data processing apparatus and methods, which are arranged to detect code words embedded in versions of material items. In some applications the code words are used to uniquely identify the material items.

BACKGROUND OF THE INVENTION

A process in which information is embedded in material for the purpose of identifying the material is referred to as watermarking.

Identification code words are applied to versions of material items for the purpose of identifying the version of the material item. Watermarking can provide, therefore, a facility for identifying a recipient of a particular version of the material. As such, if the material is copied or used in a way, which is inconsistent with the wishes of the distributor of the material, the distributor can identify the material version from the identification code word and take appropriate action.

In this description, an item of material, which is copied or used in a way, which is inconsistent with the wishes of the originator, owner, creator or distributor of the material, will be referred to for convenience as an offending item of material or offending material.

The material could be any of video, audio, audio/video material, software programs, digital documents or any type of information bearing material.

For a watermarking scheme to be successful, it should be as difficult as possible for the users to collude in order to mask or remove the identification code words. It should also be as difficult as possible for users to collude to alter the identification code word to the effect that one of the other users is falsely indicated as the perpetrator of an offending item of material. Such an attempt by users to collude to either mask the code word or alter the code word to indicate another user is known as a collusion attack.

Any watermarking scheme should be arranged to make it difficult for users receiving copies of the same material to launch a successful collusion attack. A watermarking scheme should therefore with high probability identify a marked material item, which has been the subject of a collusion attack. This is achieved by identifying a code word recovered from the offending material. Conversely, there should be a low probability of not detecting a code word when a code word is present (false negative probability). In addition the probability of falsely detecting a user as guilty of taking part in a collusion attack, when this user has not taken part, should be as low as possible (false positive probability).

U.S. Pat. No. 5,664,018 discloses a watermarking process in which a plurality of copies of material items are marked with a digital watermark formed from a code word having a predetermined number of coefficients. The watermarked material item is for example an image. The apparatus for introducing the watermark transforms the image into the Discrete Cosine Transform (DCT) domain. The digital watermark is formed from a set of randomly distributed coefficients having a normal distribution. In the DCT domain each code word coefficient is added to a corresponding one of the DCT coefficients. The watermarked image is formed by performing an inverse DCT. A related publication entitled "Resistance of Digital Watermarks to Collusion Attacks", by J. Kilian, F. T. Leighton et al, published by MIT, Jul. 27, 1998, provides a detailed mathematical analysis of this watermarking process to prove its resistance to attack.

SUMMARY OF THE INVENTION

An object of the present invention is to provide a practical watermarking system, which utilises code words having coefficients which are randomly distributed as proposed as in U.S. Pat. No. 5,664,018.

According to an aspect of the present invention there is provided a detecting data processing apparatus operable to identify at least one of a plurality of code words present in a marked version of a material item. The marked version has been formed by combining each of a plurality of samples of an original version of the material item with one of a corresponding plurality of code word coefficients. The detecting apparatus comprises a registration processor operable to compare the samples of the marked material item with a copy of the original material item samples, and if a sample of the marked material item and the original material item differ by a comparison threshold, to replace the compared sample of the marked material item with the corresponding sample from the original material item. The detecting data processor includes a decoding processor operable to generate a recovered code word from the marked material item, and a detection processor operable to generate a correlation value for each code word in the set. The decoding processor correlates the recovered code word with respect to each regenerated code word of the set, and detects at least one code word for the correlation value of the regenerated code word which exceeds a predetermined correlation threshold.

The present invention addresses a technical problem of detecting watermark code words from offending copies of material items in which artefacts or other noise or degradation introduce samples into the offending material item which were not present in the original material item. For example, if the marked material item is an image reproduced at a cinema as part of a film, a pirate copy may be generated by recording the image using a camcorder. As such, artefacts may be introduced into the offending recorder marked image as a result of noise or an object such as a person's head passing between the camcorder and the cinema screen.

Embodiments of the present invention provide a detecting data processing apparatus which compares the samples of the marked material item with samples of the original material item. If the comparison reveals that the samples of the marked and original material item differ by greater than a predetermined amount (comparison threshold), then the compared sample is replaced by the corresponding sample from the original material item. As a result a false negative detection probability is reduced. This is because the presence of artefacts in the offending marked image will produce samples which may differ greatly from the samples of the original material item. Typically, the code word samples are recovered from the image by subtracting the samples of the original image from the corresponding samples of the marked material item to which the code word coefficients were added. Code word coefficients recovered from parts of the marked material item which were not present in the original material item will not correlate with the corresponding regenerated code word coefficients. Moreover, a large difference between the marked and the original material item samples can introduce a bias in the correlation sum, reducing the likelihood of correctly detecting the presence of the code word. Replacing compared samples exceeding a predetermined threshold reduces the effect of this bias caused by artefacts in the marked material item.

According to an aspect of the present invention there is provided a detecting data processing apparatus operable to identify at least one of a plurality of code words present in a marked version of a material item. The marked version has been formed by combining each of a plurality of samples of an original version of the material item with one of a corresponding plurality of code word coefficients. The detecting apparatus comprises a registration processor operable to normalise the mean and the variance of the samples of the marked material item with respect to the mean and the variance of the samples of the original material item. The detecting apparatus includes a decoding processor operable to generate a recovered code word from the marked material item, and a detection processor operable to generate a correlation value for each code word in the set of code words. The detection processor correlates the recovered code word with respect to each regenerated code word of the set, and detects at least one code word for the correlation value of the regenerated code word exceeding a predetermined correlation threshold.

Embodiments of this aspect of the invention address a technical problem of detecting a code word from a marked material item which has under gone some processing with the effect of changing the dynamic range of the samples of the material item. For example, if the marked material item is an image which is copied by taking a photograph of a watermarked copy of the image, then the contrast of the image may be changed with respect to the original image. As a result a likelihood of false negative detection is increased, because each of the samples of the marked image to which code word coefficients have been added will have changed in value. As a result, the recovered code word coefficients produced by subtracting the samples of the original image from the samples of the marked copy of the image may have a substantially increased or decreased relative value. The increased or decreased relative value can have an effect of influencing the calculation of the correlation sum of the recovered code word with respect to the regenerated code word. This influence can have an effect of increasing the false negative probability which is the likelihood of not detecting a code word when a code word is present in the offending material item.

According to another aspect of the present invention there is provided a detecting data processing apparatus operable to identify at least one of a plurality of code words present in a marked version of a material item. The marked version has been formed by combining each of a plurality of samples of an original version of the material item with one of a corresponding plurality of code word coefficients. The detecting data processing apparatus comprises a decoding processor operable to generate a recovered code word from the marked material item, and a detection processor. The detection processor is operable to generate a correlation value for each code word in the set by correlating the recovered code word with respect to each regenerated code word of the set. The detection processor is operable to detect at least one code word for the correlation value of the regenerated code word exceeding a predetermined correlation threshold. The variance of the values of the regenerated code word coefficients is arranged to be substantially unity.

Introducing a watermark code word into a material item can have an effect of disturbing the original material item. If the strength of the watermrk is too strong, the effect of the watermark can be perceivable, whereas preferably the presence of the watermark is imperceptible to a user of the material item. To this end the watermark strength is adjusted in accordance with the samples of the material item to which the code word coefficients are added. This allows a minimum watermark strength to be used. Previously proposed detecting apparatus calculate a correlation of the recovered code word and regenerated code words of the set, using the watermark strength which was used to add the watermark at the encoding data processor. As such previously proposed detecting data processors suffer a disadvantage because the strength would have to be known by the detecting data processor. However it has been discovered that setting the variance of the regenerated code words to unity provides a correlation result for the recovered and regenerated code words which permits the presence of a code word to be detected from a marked material item.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which.

DESCRIPTION OF PREFERRED EMBODIMENTS

Watermarking System Overview

An example embodiment of the present invention will now be described with reference to protecting video images. The number of users to which the video images are to be distributed determines the number of copies. To each copy an identification code word is added which identifies the copy assigned to one of the users.

Video images are one example of material, which can be protected by embedding a digital code word. Other examples of material, which can be protected by embedding a code word, include software programs, digital documents, music, audio signals and any other information-bearing signal.

Figure 1:
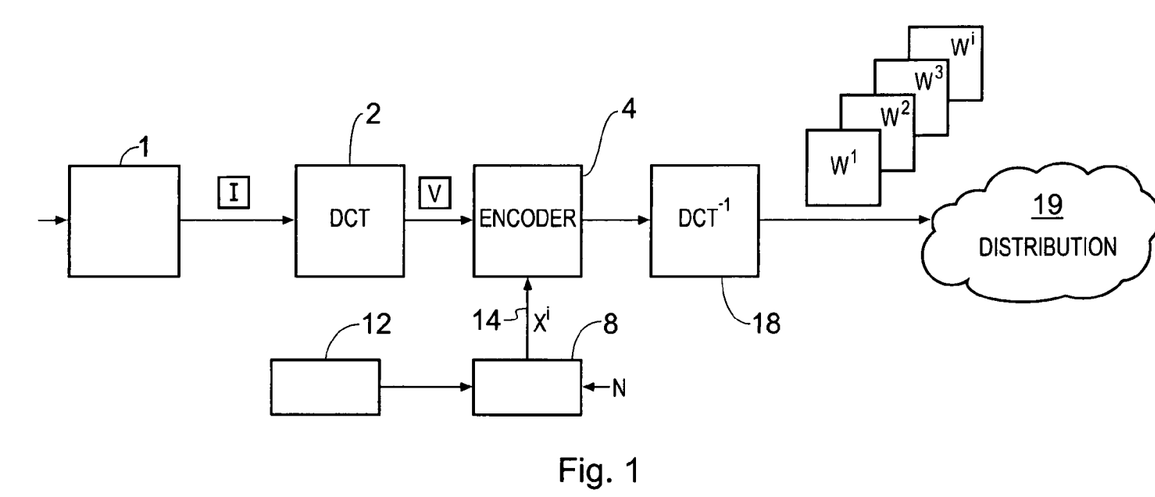
FIG. 1 is a schematic block diagram of an encoding image processing apparatus.

An example of an encoding image processing apparatus, which is arranged to introduce an identification code word into a copy of an original image, is shown in FIG. 1. An original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, which is otherwise, produce from the image pixels. Therefore, where appropriate the terms samples and pixels are interchangeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus for each code word there is a corresponding seed which is store in a data store 12. Therefore it will be understood that to generate the code word $X^i$, $seed_i$ is retrieved from memory 12 and used to initialise the random number generator within the code word generator 8.

In the following description the DCT version of the original image is represented as V, where;

$$V=\{v_i\}=\{v_1,v_2,v_3,v_4, \ldots v_N\}$$

and $v_i$ are the DCT coefficients of the image. In other embodiments the samples of the image $v_i$ could represent samples of the image in the spatial domain or in an alternative domain.

Each of the code words $X^i$ comprises a plurality of n code word coefficients, where;

$$X^i=\{x_j^i\}=\{x_1^i,x_2^i,x_3^i,x_4^i, \ldots x_n^i\}$$

The number of code word coefficients n corresponds to the number or samples of the original image V. However, a different number of coefficients is possible, and will be set in dependence upon a particular application.

A vector of code word coefficients $X^i$ forming the i-th code word is then passed via channel 14 to the encoder 4. The encoder 4 is arranged to form a watermarked image $W^i$ by adding the code word $X^i$ to the image V. Effectively, therefore, as represented in the equation below, each of the code word coefficients is added to a different one of the coefficients of the image to form the watermark image $W^i$.

$$W^i=V+X^i$$

$$W^i=v_1+x_1^i, v_2+x_2^i, v_3+x_3^i, v_4+x_4^i, \ldots, v_n+x_n^i$$

As shown in FIG. 1, the watermarked images $W^i$ are formed at the output of the image processing apparatus by an forming inverse DCT of the image produced at the output of the encoding processor 4 by the inverse DCT processor 18.

Therefore as represented in FIG. 1 at the output of the encoder 4 a set of the watermarked images can be produced. For a data word of up to 20-bits, one of 10 000 000 code words can be selected to generate 10 million watermarked $W^j$ versions of the original image I.

Although the code word provides the facility for uniquely identifying a marked copy $W^i$ of the image I, in other embodiments the 20 bits can provide a facility for communicating data within the image. As will be appreciated therefore, the 20 bits used to select the identification code word can provide a 20 bit pay-load for communicating data within the image V.

The encoding image processing apparatus which is arranged to produce the watermarked images shown in FIG. 1 may be incorporated into a variety of products for different scenarios in which embodiments of the present invention find application. For example, the encoding image processing apparatus may be connected to a web site or web server from which the watermarked images may be downloaded. Before downloading a copy of the image, a unique code word is introduced into the downloaded image, which can be used to detect the recipient of the downloaded image at some later point in time.

In another application the encoding image processor forms part of a digital cinema projector in which the identification code word is added during projection of the image at, for example, a cinema. Thus, the code word is arranged to identify the projector and the cinema at which the images are being reproduced. Accordingly, the identification code word can be identified within a pirate copy produced from the images projected by the cinema projector in order to identify the projector and the cinema from which pirate copies were produced. Correspondingly, a watermarked image may be reproduced as a photograph or printout in which a reproduction or copy may be made and distributed. Generally therefore, the distribution of the watermarked images produced by the encoding image processing apparatus shown in FIG. 1 is represented by a distribution cloud 19.

Detecting Processor

Figure 2:
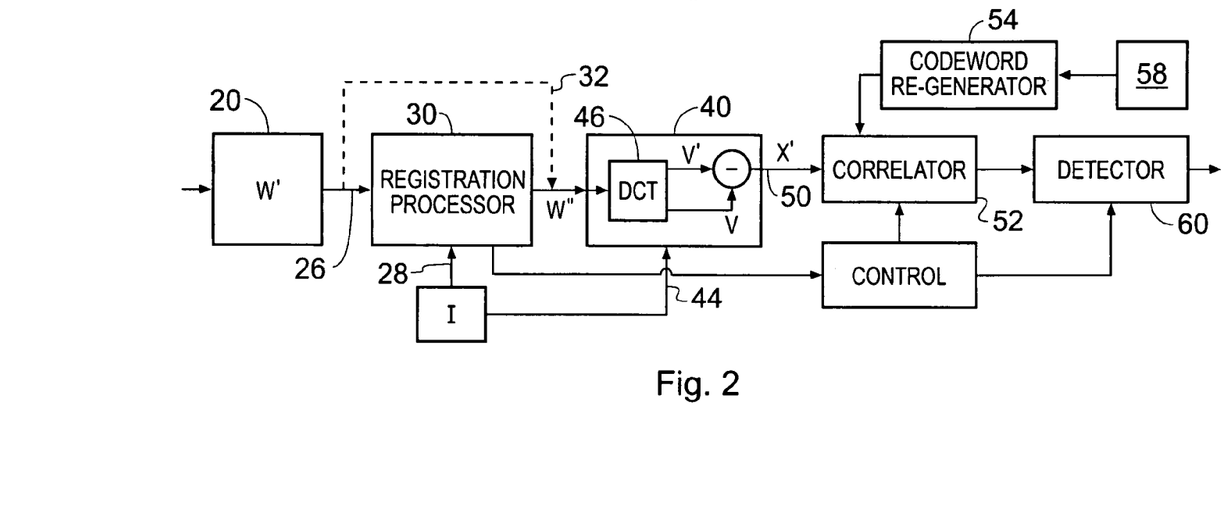
FIG. 2 is a schematic block diagram of a detecting image processing apparatus.

A detecting image processing apparatus which is arranged to detect one or more of the code words, which may be present in an offending marked image is shown in FIG. 2. Generally, the image processor shown in FIG. 2 operates to identify one or more of the code words, which may be present in an offending copy of the image.

The offending version of the watermarked image W' is received from a source and stored in a frame store 20. Also stored in the frame store 20 is the original version of the image I, since the detection process performed by the image processor requires the original version of the image. The offending watermarked image W' and the original version of the image are then fed via connecting channels 26, 28 to a registration processor 30.

As already explained, the offending version of the image W' may have been produced by photographing or otherwise reproducing a part of the watermarked image $W^i$. As such, in order to improve the likelihood of detecting the identification code word, the registration processor 30 is arranged to substantially align the offending image with the original version of the image present in the frame store 20. The purpose of this alignment is to provide a correspondence between the original image samples I and the corresponding samples of the watermarked image $W^i$ to which the code word coefficients have been added.

Figure 3A:
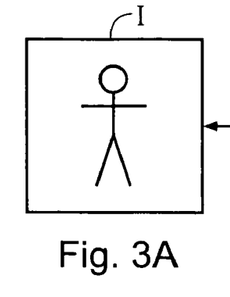
FIG. 3A is a representation of an original image.
Figure 3B:
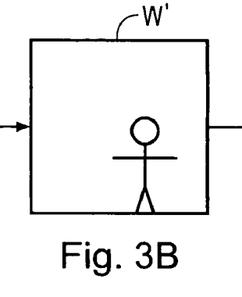
FIG. 3B is a representation of a marked image and FIG. 3C is the marked image after registration.
Figure 3C:
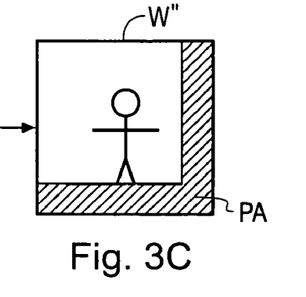

The effects of the registration are illustrated in FIG. 3. In FIG. 3 an example of the original image I is shown with respect to an offending marked version of the image W'. As illustrated in FIG. 3, the watermarked image W' is offset with respect to the original image I and this may be due to the relative aspect view of the camera from which the offending version of the watermarked image was produced.

In order to recover a representation of the code word coefficients, the correct samples of the original image should be subtracted from the corresponding samples of the marked offending image. To this end, the two images are aligned. As shown in FIG. 3, the registered image W'' has a peripheral area PA which includes parts which were not present in the original image.

As will be appreciated in other embodiments, the registration processor 30 may not be used because the offending image W' may be already substantially aligned to the originally version of the image I, such as, for example, if the offending version was downloaded via the Internet. Accordingly, the detecting image processor is provided with an alternative channel 32, which communicates the marked image directly to the recovery processor 40.

The registered image W'' is received by a recovery processor 40. The recovery processor 40 also receives a copy of the original image I via a second channel 44. The registered image W'' and the original image I are transformed by a DCT transform processor 46 into the DCT domain. An estimated code word X' is then formed by subtracting the samples of the DCT domain marked image V' from the DCT domain samples of the original image V as expressed by the following equations:

$$X' = V' - V$$
$$= v_1' - v_1, v_2' - v_2, v_3' - v_3, v_4' - v_4, \ldots, v_n' - v_n,$$
$$= x_1', x_2', x_3', x_4', \ldots x_n'$$

The output of the recovery processor 40 therefore provides on a connecting channel 50 an estimate of the coefficients of the code word which is to be identified. The recovered code word X' is then fed to a first input of a correlator 52. The correlator 52 also receives on a second input the regenerated code words $X^i$ produced by the code word generator 54. The code word generator 54 operates in the same way as the code word generator 8 which produces all possible code words of the set, using the predetermined seeds which identify uniquely the code words from a store 58.

The correlator 52 forms n similarity sim(i) values. In one embodiment, the similarity value is produced by forming a correlation in accordance with following equation:

$$sim(i) = \frac{X^i \cdot X'}{\sqrt{X^i \cdot X'}} = \frac{x_1^i \cdot x_1' + x_2^i \cdot x_2' + x_3^i \cdot x_3' + \ldots + x_n^i \cdot x_n'}{\sqrt{x_1^i \cdot x_1' + x_2^i \cdot x_2' + x_3^i \cdot x_3' + \ldots + x_n^i \cdot x'}}$$

Figure 4:
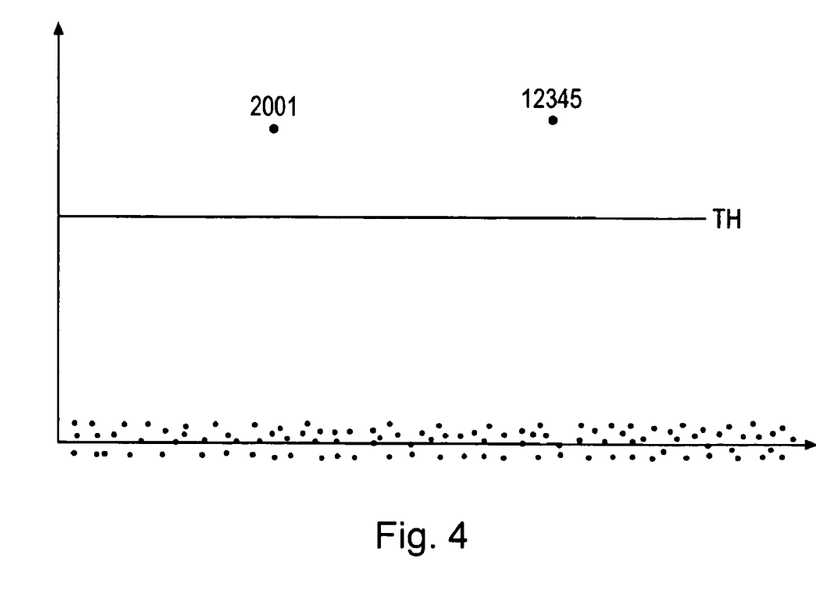
FIG. 4 is a graphical representation of an example correlation result for each of a set of N code words.

Each of the n similarity values sim(i) is then fed to a detector 60. The detector 60 then analyses the similarity values sim(i) produced for each of the n possible code words. As an example, the similarity values produced by the correlator 52 are shown in FIG. 4 with respect to a threshold TH for each of the possible code words. As shown in FIG. 4, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size, which in this case is 10 million and the watermarking strength α, the height of the threshold TH can be set in order to guarantee the false detection probability. As in the example in FIG. 4, if the similarity values produced by the correlator 52 exceed the threshold then, with this false positive probability, the recipients of the marked image are considered to have colluded to form the offending watermarked version of the image $W^i$.

The following sections illustrate advantages and features of the operation of the watermarking system illustrated in FIGS. 1 and 2.

Registration

The process of aligning the offending marked version of the image with the copy of the original image comprises correlating the samples of the original image with respect to the marked image. The correlation is performed for different shifts of the respective samples of the images. This is illustrated in FIG. 5.

Figure 5A:
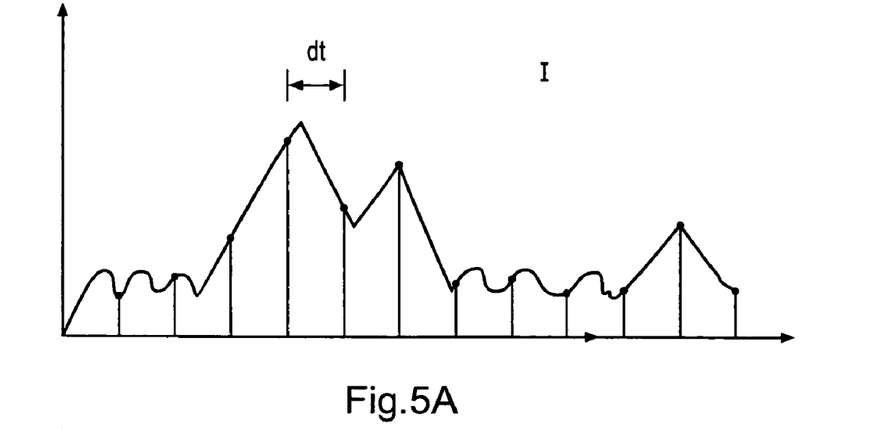
FIG. 5A is a graphical representation of samples of the original image I.
Figure 5B:
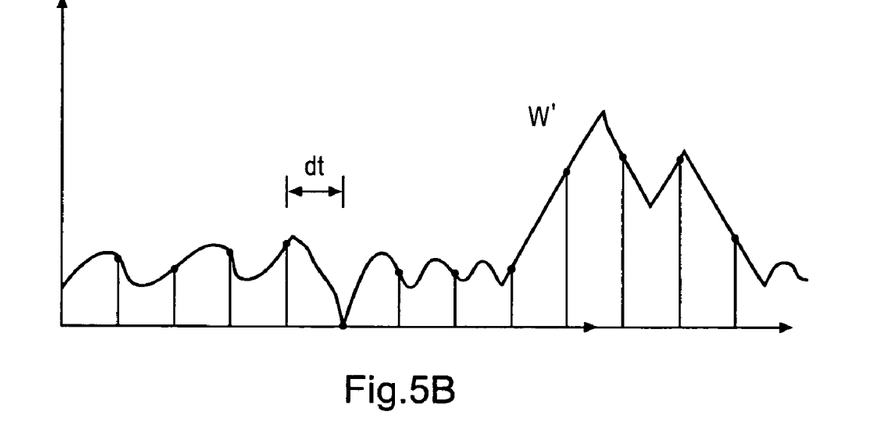
FIG. 5B is a graphical representation of samples of the watermarked image W'.

FIG. 5A provides an illustration of discrete samples of the original image I, whereas FIG. 5B provides an illustration of discrete samples of the offending watermarked image W'. As illustrated in the FIGS. 5A and 5B, the sampling rate provides a temporal difference between samples of dt. A result of shifting each of the sets of samples from the images and correlating the discrete samples is illustrated in FIG. 5C.

Figure 5C:
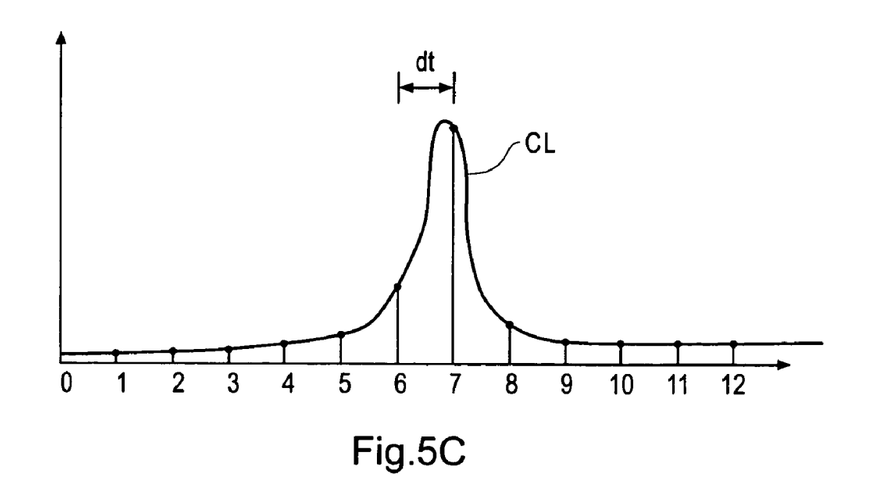
FIG. 5C is a graphical representation of correlation results for the original image and the watermarked image with respect to discrete sample shifts.

As shown in FIG. 5C, for a shift of between 6 and 7 samples, the correlation peak is highest. The offending watermarked image is therefore shifted by this amount with respect to the original image to perform registration.

Improved Decoding Techniques

Strength of Regenerated Code Word Set at Unity

As explained above, the code words of the watermarking system are formed by generating a plurality of code word coefficients from pseudo randomly distributed numbers. The numbers are generated by a pseudo random number generator which is initialised by seed, which determines the numbers produced. In some embodiments a unique seed is provided for each word. However in other embodiments at least some of the code words are generated by cyclically shifting a first base code word. Each cyclically shifted code word may be permuted in accordance with a secret permutation code to improve resistance to a collusion attack.

In preferred embodiments the mean of the numbers produced to form the code word coefficients is 0 and the variance is set at α. The variance α is the value or strength of the watermark. Thus the greater the strength, the more likely the code word is to be detected by the detecting image processor. However, conversely, the larger the strength, the more likely the effects of the code word is to be perceivable on the watermarked image.

As already explained the detecting image processor is provided with a correlator 52 and a code word generator 54. The correlator therefore correlates the recovered code word X' with respect to each of the code words in a set of code words to produce similarity value sim(i). An advantage is provided to the code word generator 54 by setting the variance of the random numbers generated to unity. Therefore, although the pseudo random number generator in the code word generator 54 corresponds to the number generator in the code word generator 8 in the encoding image processor, the variance of the numbers produced is set at unity, rather than to $\alpha$. The strength of the water mark code words is therefore set at 1.

The correlation sum formed by the correlator as illustrated above is not affected by the setting of the variance of the regenerated code words to 1. This means that if user i is innocent, the similarity value for user i, sim(i) is a normally distributed random variable with a mean of 0 and the variance of 1. As a result, the threshold applied by the detector 60 is always independent of the encoding strength $\alpha$. As such, the detecting processor does not require knowledge of the encoding strength $\alpha$. The encoding strength $\alpha$ can therefore be set independently from the detection processor.

Correlating With Image Artefacts

Figure 6A:
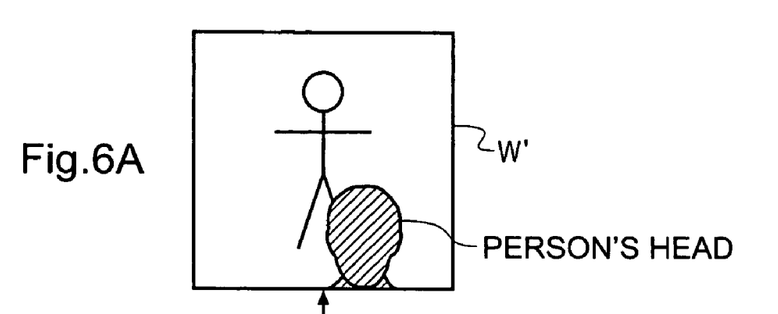
FIG. 6A is a representation of a watermarked image which includes artefacts.

Although the offending marked image will correspond substantially to the original image, even if the images are otherwise aligned, there may appear artefacts in the offending marked image which were not present in the original version of the image. Such artefacts may be a caused, for example, when a pirate copy of the watermarked image W' is generated. If a camcorder is used to record cinema images of a film, where the marked image is projected onto the cinema screen, artefacts may be introduced into the offending copy of the marked image, for example, if a person's head moves between the cinema screen and the camcorder. The person's head will cause part of the watermarked image to be obscured. This is illustrated in FIG. 6A, which provides an example of the offending marked image W' with respect to the original image I shown in FIG. 6B. As represented in FIG. 6A, the offending image W' includes an artefact caused by a person's head passing between the cinema screen and the camcorder.

Figure 6B:
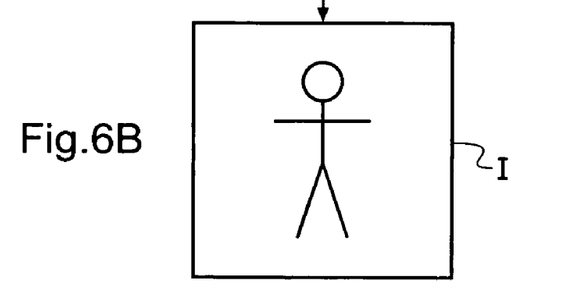
FIG. 6B is a representation of the original of the image represented in FIG. 6A.

The offending copy of the marked image will therefore have features present, which were not present in the original image. As explained above, in order to form the recovered code word X', the samples in the DCT domain V are subtracted from the samples of the offending watermarked image V'. However, the parts of the offending watermarked image where the artefacts are present will not correlate with the corresponding parts of the original image. As a result, the similarity values sim(i) formed by the correlator 52 with respect to each of the reproduced code words in the set can be significantly affected. This is because large differences between the images will produce recovered code word coefficient values, which may be significantly different from the regenerated code word coefficient values. There is therefore an increased false negative likelihood, because the similarity value sim(i) for the correct code word, which corresponds to the recovered code word, will not exceed the threshold in the detector 60.

Figure 6C:
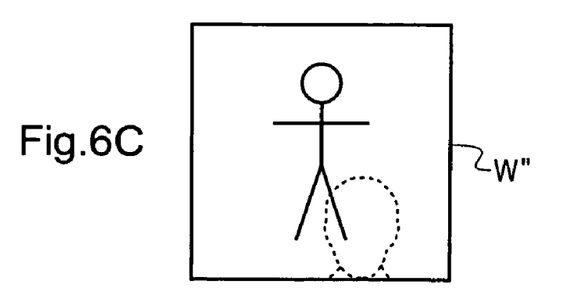
FIG. 6C is a representation of the marked image of FIG. 6A after a registration processor shown in FIG. 2 has performed pre-processing in accordance with an embodiment of the present invention.

Advantageously, to alleviate this problem caused by artefacts, the registration processor is arranged to compare the samples of the original image with the offending watermarked image. If the mean absolute difference between these samples exceeds a predetermined comparison threshold, then the parts of the offending watermarked image for these samples are replaced with the samples from the original image. This replacement process is illustrated in FIG. 6C. In FIG. 6C the offending image W" is shown with those parts of the offending marked image W' not corresponding to the original image I replaced with corresponding parts from the original image. Effectively, although these replaced samples cannot carry corresponding coefficients of a code word, the similarity value sim(i) formed by the correlation calculation is less likely to be adversely effected.

Therefore, a likelihood of correctly detecting the code word from the offending watermarked image, in the presence of artefacts is improved, reducing the false negative probability. This is expressed mathematically as follows:

If $w_i' - i_i > th_{comp}$ then $w_i' = i$

Image Contrast Pre-Processing

A further improvement is provided to the detection of a watermark code word by pre-processing the marked image before detection of the code word is attempted. The detecting image processor shown in FIG. 2 in accordance with an embodiment of the invention is arranged to pre-process the marked image to the effect of correcting for a difference in contrast between the offending watermarked image and that of the original image. If the offending watermarked image has been reproduced by, for example, photographing the watermarked image, then there is a likelihood of a change in contrast of the offending image produced from the photograph. For example, the samples of the original image to which the code word coefficients have been added may have been formed from the luminance values of the image. As a result, a change in contrast will have an effect of altering the relative difference between the DCT coefficients of the original image and the DCT coefficients of the offending watermarked image. This can have an effect of reducing the likelihood of correctly detecting the code word from the offending watermarked image. This is because the difference in the values of the samples from the watermarked image with respect to the samples of the original image can reduce the likelihood of correctly recovering the code word. This is represented mathematically below:

$W = V + X$ $W' = CW = CV + CX$ Where W' is the offending marked image.

$X' = CV + CX - V = (C-1)V + CX$ Where C is a scaling factor introduced as a result of the change in contrast.

In order to address this technical problem, the registration processor 30 of the detector shown in FIG. 2 is used to pre-process the offending image. The pre-processing is arranged to reduce a difference between the contrast of the two images. This reduction is effected by normalising the offending watermarked image with respect to the original image by making the standard deviation and the mean of the samples of the offending watermarked image and the samples of the original image the same. This is expressed mathematically as follows:

$$V' \to \text{Normalise} \to V'^N = v_i' \to \frac{v_i' - \mu}{\sigma}$$

$$V \to \text{Normalise} \to V^N = v_i \to \frac{v_i - \mu}{\sigma}$$

As a result of the normalisation process, the likelihood of false negative detection is reduced, because the relative difference in the magnitude of the offending and original image samples will be substantially the same.

In some embodiments the normalised mean $\mu$ and the normalised variance $\sigma$ may be set to predetermined and pre-stored values. In other embodiments the normalised mean $\mu$ and the normalised variance $\sigma$ may be determined by calculating the mean and the variance of the samples of the original image I.

Other Applications

In addition to the above-mentioned applications of the encoding data processing apparatus of the watermarking system to a cinema projector and to a web server, other applications are envisaged. For example, a receiver/decoder is envisaged in which received signals are watermarked by introducing code words upon receipt of the signals from a communicating device. For example, a set top box is typically arranged to receive television and video signals from a "head-end" broadcast or multi-cast device. As will be appreciated in this application, the encoding data processing apparatus forms part of the set top box and is arranged to introduce watermark code words into the video signals as the signals are received and decoded. In one example embodiment, the watermark code word is arranged to uniquely identify the set top box which receives and decodes the video signals.

In a further embodiment a digital cinema receiver is arranged to receive a digital cinema film via a satellite. The receiver is arranged to receive signals representing the digital cinema film and to decode the signals for reproduction. The receiver includes an encoding data processing apparatus, which introduces a watermark code word into the decoded film signals. The watermark code word is provided, for example, to uniquely identify the cinema receiving the film signals.

A further example embodiment may comprise a digital camera or camcorder or the like which includes a memory and a memory controller. An encoding data processing apparatus according to an embodiment of the present invention is arranged to introduce a watermark code word stored in the memory into video signals captured by the camera. According to this embodiment, the encoding data processing apparatus does not include a code word generator because the code word is pre-stored in the memory. Under the control of the memory controller the code word stored in the memory is embedded into the video signals, uniquely or quasi-uniquely identifying the video signals.

In a further embodiment, an encoding data processing apparatus according to an embodiment of the invention is operable to encode a sequence of watermark code words into different frames of digital images forming a continuous or moving picture. The code words may be related to one another and may be used to identify each of the images separately.

Various further aspects and features of the present invention are defined in the appended claims. Various modifications can be made to the embodiments herein before described without departing from the scope of the present invention.

The invention claimed is:

1. A detecting data processing apparatus operable to identify at least one of a plurality of code words present in a marked version of an original material item, said marked version having been formed by combining each of a plurality of samples of a copy of the original material item with one of a corresponding plurality of code word coefficients, said detecting apparatus comprising:

a registration microprocessor configured to process the samples of said marked version with respect to samples of a copy of the original material item by normalizing the mean and the variance of the samples of said marked version with respect to the mean and the variance of the samples of the original material item;

a decoding microprocessor configured to generate a recovered code word from said marked material item;

a code word regenerator configured to regenerate each code word in a set of possible code words;

a detection microprocessor configured to generate a correlation value for each code word in the set by correlating the recovered code word with respect to each regenerated code word of the set and to detect at least one code word for the correlation value of the regenerated code word exceeding a predetermined correlation threshold, wherein said regeneration microprocessor is configured to normalize the mean and the variance Of the samples of said marked version by calculating the mean and the variance of the samples of the original material item, and for each sample of said marked version and the original material item, normalizing by subtracting the mean and dividing by the variance calculated from the samples of the original material item.

2. A detecting data processing apparatus as claimed in claim 1, wherein the normalized means and variance are predetermined values.

3. A recording medium including computer program providing computer executable instructions, which when loaded onto a computer causes the computer to operate as the detecting data processing apparatus of claim 1.

4. A method of identifying one or more of a predetermined set of code words present in a marked version of an original material item, said marked version having been formed by combining each of a plurality of samples of a copy of said original material item with one of a corresponding plurality of code word coefficients, said method comprising:

processing the samples of said marked version with respect to samples of a copy of the material item;

generating a recovered code word from said marked material item;

regenerating each code word in a set of possible code words;

generating a correlation value for each code word in the set by correlating the recovered code word with respect to each regenerated code word of the set;

detecting at least one code word for the correlation value of the regenerated code word exceeding a predetermined correlation threshold, wherein the processing the samples of said marked version with respect to the samples of a copy of the material item includes normalizing the mean and the variance of the samples of said marked version with respect to the mean and the variance of the samples of the original material item, by calculating the mean and the variance of the original material, and for each sample of said marked version and the original material item, normalizing by subtracting the mean and dividing by the variance calculated from the samples of the original material item.

5. A recording medium including computer executable instructions, which when loaded on to a computer causes the computer to peform the method according to claim 4.

* * * * *

UNITED STATES PATENT AND TRADEMARK OFFICE
CERTIFICATE OF CORRECTION

PATENT NO. : 7,263,615 B2
APPLICATION NO. : 10/317973
DATED : August 28, 2007
INVENTOR(S) : Jason C. Pelly et al.

Page 1 of 1

It is certified that error appears in the above-identified patent and that said Letters Patent is hereby corrected as shown below:

Column 12, line 12, change "regeneration" to --registration--.

Signed and Sealed this

Twenty-first Day of October, 2008

JON W. DUDAS
*Director of the United States Patent and Trademark Office*